Dec. 27, 1932.  W. J. BESLER  1,892,034
BRAKE MECHANISM FOR MOTOR VEHICLES
Filed Nov. 15, 1927   2 Sheets-Sheet 1
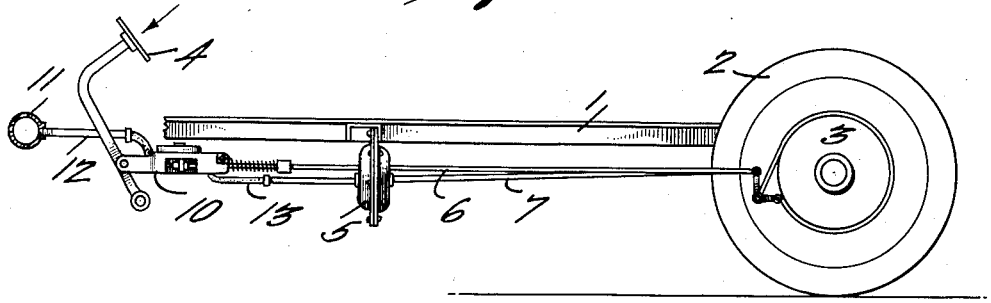
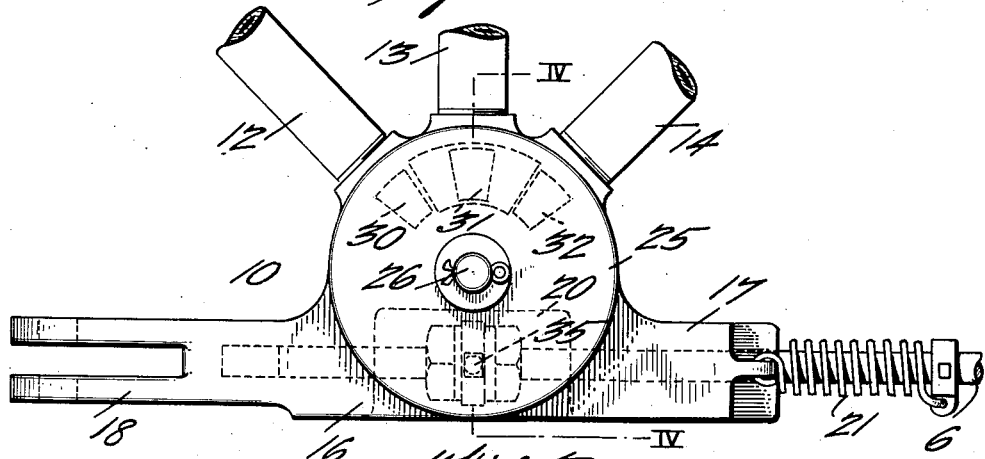
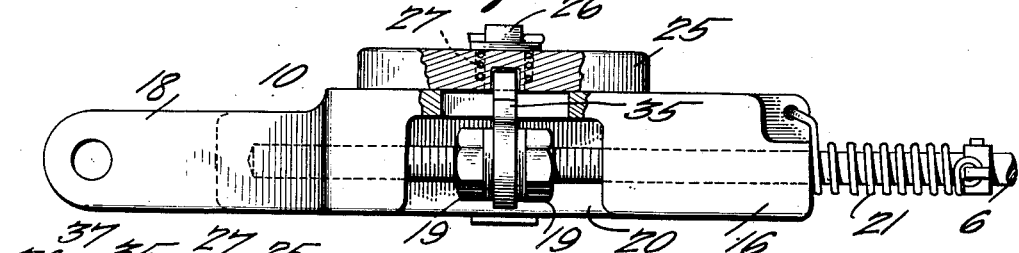
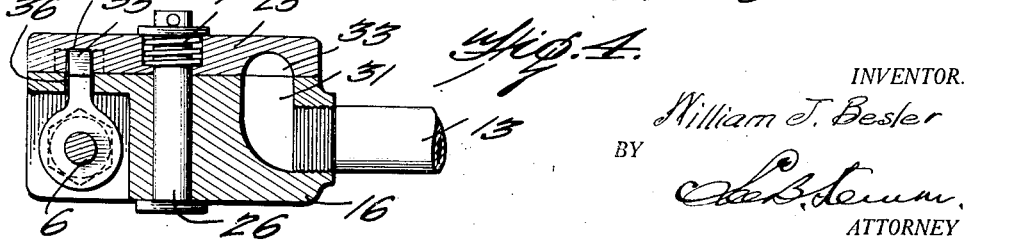
INVENTOR.
William J. Besler
BY
ATTORNEY

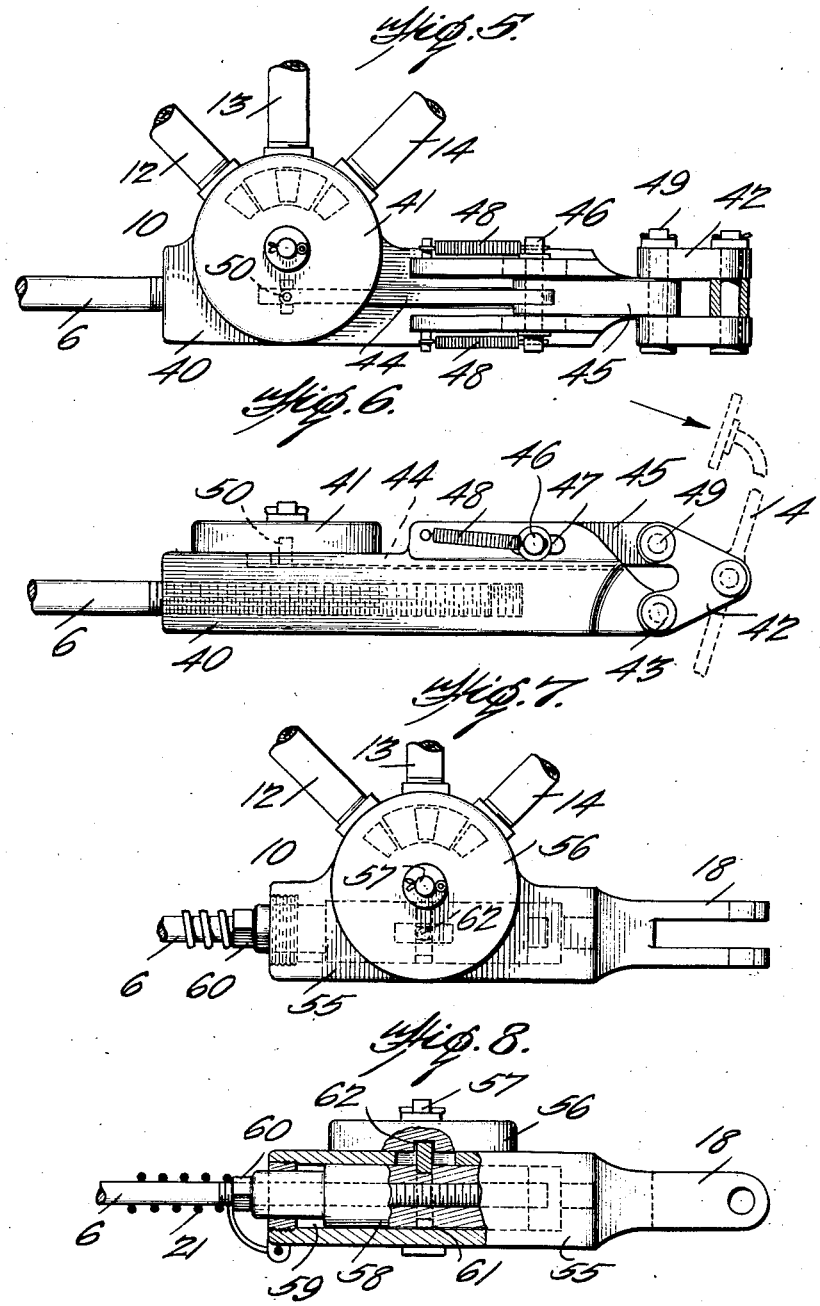

Patented Dec. 27, 1932

1,892,034

UNITED STATES PATENT OFFICE

WILLIAM J. BESLER, OF PLAINFIELD, NEW JERSEY

BRAKE MECHANISM FOR MOTOR VEHICLES

Application filed November 15, 1927. Serial No. 233,389.

My invention relates to brake mechanism for motor vehicles and more particularly to brake mechanism of the fluid-pressure operated or servo-motor type embodying a control valve which is actuated by a lever or brake pedal.

The object of my invention is to simplify and improve the construction of the control valve and to provide a valve unit which may be easily installed on a motor vehicle even though already equipped with ordinary manual or pedal-operated brakes.

In order to accomplish this result, the valve unit is constructed in the form of a combined valve and mechanical coupling member which in its preferred form is adapted to replace the usual turnbuckle or other adjustable connection in the brake rigging. A threaded turnbuckle having a bifurcated end is ordinarily used as a connection between the brake pedal and brake rod to provide a convenient connection and to permit of the necessary adjustment between the pedal and the brake elements controlled thereby.

In accordance with my invention, a simple fitting, which includes the valve unit, is installed in place of this turnbuckle and provides an adjustable lost-motion connection between certain elements of the brake rigging; for example, between the brake pedal and the brake rod extending to the brakes. In addition, this fitting element embodies relatively movable valve elements which are rendered operative during the period of lost motion by the depression and release of the brake lever or pedal; and the fitting further provides a mechanical connection through which manual brake-applying force may be exerted to supplement the brake motor or apply the brakes independently thereof.

It will be apparent that brake mechanism embodying my invention is simpler than that heretofore employed because a number of elements are combined in a single unit, but perhaps the most important advantage thereof resides in the fact that its installation upon a motor vehicle is much easier than is the case with any similar mechanism of the prior art.

For a better understanding of my invention, reference should be had to the accompanying drawings illustrating preferred embodiments thereof. In the drawings, Fig. 1 is a side elevational view of a portion of a vehicle chassis equipped with brake mechanism embodying my invention;

Figs. 2 and 3 are detail views of the combined valve and coupling member shown in Fig. 1;

Fig. 4 is a sectional view of the same on the line IV—IV of Fig. 2;

Figs. 5 and 6 are detail views of a modified form of valve and coupling member; and Figs. 7 and 8 are similar views of another modification embodying the invention.

Referring to Fig. 1, a portion of the chassis of a motor vehicle is shown conventionally, said chassis comprising a frame 1 and wheels 2. Friction brake elements 3 are provided in connection with the wheels 2. The brake elements 3 are adapted to be controlled by a brake pedal 4 and a fluid-pressure motor 5 through brake rods 6 and 7, respectively.

A fitting 10 combining a fluid-control valve and coupling member is mounted on the forward end of the brake rod 6 in place of the usual turnbuckle connection and provides an adjustable lost-motion connection between the pedal and brake rod. Obviously, the member 10 might be disposed at any point in the brake rigging where the turnbuckle or other adjustment member is employed.

The member 10 by its included valve also serves to control the admission and exhaust of fluid to and from the fluid-pressure motor 5 to operate the brakes in accordance with the operation of the brake pedal 4. A source of fluid pressure, which may be a storage tank or the intake manifold of an internal combustion engine for propelling the vehicle, is indicated at 11. The source 11 is connected with the fluid-pressure motor 5 through a pipe connection 12, the valve of fitting 10 and a pipe connection 13, the system illustrated being adapted to operate from a source of fluid pressure lower than atmospheric pressure.

It will be understood that depression of the brake pedal 4 energizes the fluid-pressure motor 5 to apply the brakes, and release of the pedal vents the motor to atmosphere to release the brakes. The lost motion provided by the member 10 is so arranged that the application and release of the brakes are ordinarily accomplished by the servo-motor 5, but the braking effort of the servo-motor may be supplemented by exerting pressure on the brake pedal as in braking where no power brake is employed, if necessary.

The invention may be applied to various types of braking mechanisms, of any suitable construction, and other modifications of the arrangement shown in the drawings may be made without departing from the scope of the invention, which is primarily concerned with the arrangement in a servo-brake system of the fitting 10 which combines the valve and coupling member, above referred to.

The detailed construction of the fitting 10 is shown in Figs. 2, 3, and 4. It comprises a casing or base member 16 provided with an offset tubular portion 17 adapted to receive the brake rod 6. The opposite end 18 of the portion 17 from that which receives the brake rod is in the form of a clevis or fork so that it is adapted to be readily secured to the brake pedal 4. The brake rod 6 is supported so as to be movable in the base portion 16 of the fitting. The movement of the brake rod relative to the fitting 10 is limited, however, by the clamping nuts 19 which are disposed upon the threaded end of the rod 6 and lie within a recess 20 in the base portion of the fitting. The proper adjustment of the brake rigging is effected by adjusting the positions of the clamping nuts 19. A tension spring 21 connected between the brake rod 6 and the fitting 10 tends to hold the movable parts in predetermined relation and acts as a return spring for the brake pedal 4.

A movable valve element 25 is pivotally mounted on the base portion 16 of the fitting by means of a central pin or bolt 26. The engaging surfaces of the base and movable portions of the valve are machined and ground to a true, flat surface so as to be practically air-tight when lubricated. The surfaces will then remain effective to prevent leakage for indefinite periods of time. A compression spring 27 is provided to maintain the two cooperating elements of the valve firmly in engagement.

As shown in Figs. 2 and 4, the base portion 16 of the fitting is apertured to receive the pipe connections 12, 13 and 14, and is provided with three ports 30, 31 and 32 corresponding to said connections. The movable valve element 25 is provided with a channel or groove 33 cooperating with the ports in the base member and adapted to place the port 31 in communication with either the port 30 or the port 32 when the valve element 25 is moved through a small angle in one direction or the other from the normal position illustrated.

An operating pin 35 is provided for moving the valve element 25 to render the valve operative. The pin 35 is clamped between the clamping nuts 19 on the brake rod and extends upwardly through a slot 36 in the base member 16 into a socket 37 in the valve element 25 (see Fig. 4).

When the brake pedal 4 is depressed, the valve and coupling member 10 slides forwardly on the brake rod 6 and the pin 35 engages the valve member 25 and causes said valve member to twist in a counter-clockwise direction about the pivot 26, as viewed in Fig. 2. The valve member 25 thus establishes communication between the ports 30 and 31, thereby connecting the servo-motor 5 to the source of fluid pressure 11 which is below atmospheric pressure to actuate the brakes. The degree of application of the brakes is dependent upon the extent to which the pedal 4 is depressed because the energization of the brake motor 5 causes the brake rod 6 to move forwardly, thereby returning the valve member 25 to a position in which the port 31 is sealed. In the event that the servo-motor fails to operate, or if the brake pedal 4 is depressed to its full extent, one of the clamping nuts 19 engages the wall of the recess 20 and transmits the operating force of the brake pedal to the brake rod 6 to supplement the operation of the servo-motor.

When the brake pedal 4 is released, the pin 35 moves the valve member 25 in the opposite direction to place the port 31 in communication with the atmospheric port 32, thereby releasing the brakes. It should be noted that both the degree of application and of release of the brakes are dependent upon the position of the brake pedal 4, so that it is a simple matter to vary the degree of application of the brakes to meet any conditions in service.

In Figs. 5 and 6, a modified form of valve and coupling member is shown. As in the first modification described above, the fitting comprises a base portion 40 adapted to receive the brake rod 6 and a pivoted valve member 41 disposed upon the upper portion of the base member. The base member 41 is threaded to receive the threaded end of the brake rod 6 as in the case of the usual turnbuckle. Two link plates 42 for attachment to the brake pedal 4 are pivoted by a pin or bolt 43 to the base member 40.

A pair of links 44 and 45 are pivoted together by a pin 46, the ends of which project through elongated slots 47 in the base member 40. Resilient springs 48 are secured to the pin 46 and to the base member 40 to control the movement of the pin and the other elements of the valve. The link 45 is secured to the link plates 42 by a pin 49 so as to be moved forwardly when the brake pedal is depressed. The link 44 is also provided with a projection which engages the movable valve element 41 at the point 50 so that depression of the brake pedal causes the valve member 41 to be twisted or turned in a counter-clockwise direction to render the valve operative. It is believed that the operation of the valve in connection with a braking mechanism such as that shown in Fig. 1 will be evident in view of the above description of the modification shown in Figs. 2, 3 and 4.

Another modified form of valve which may also be employed in the braking system shown in Fig. 1 is shown in Figs. 7 and 8. As in the other modifications, the fitting comprises a base member 55 adapted to receive the brake rod 6 and a movable valve member 56 supported on the base member 55 and pivoted on the pin or bolt 57. The brake rod 6 is inserted into an internally threaded sleeve 58 which is freely movable in a channel or a recess 59 in the base portion of the fitting. The projecting end 60 of the sleeve 58 is adapted to receive a wrench or other tool to effect adjustment of the sleeve and valve fitting along the brake rod 6.

The sleeve 58 is provided with a peripheral groove 61. A pin 62 extends down from the movable valve member 56 to engage the peripheral groove and operates to twist or turn the said valve member about the pivot 57 when the brake pedal is actuated. The movement of the valve member 56 with respect to the base portion 55 places the port corresponding to the pipe connection 13 in communication with the ports corresponding to the connections 12 or 14 to control the fluid-pressure motor as described above in connection with Figs. 1 to 4.

Other modified embodiments of the invention will occur to those skilled in the art and I do not wish to be limited to the specific embodiments shown and described except as limitations may be indicated in the appended claims.

The mechanism described is simple and rugged in construction and well adapted for the stringent requirements and hard use of motor vehicle braking service. The installation of the control valve is exceedingly simple, whereas it has been found to be relatively difficult and expensive with prior devices of this character. The ordinary motor vehicle equipped with brakes utilizes a threaded brake rod engaging a turnbuckle or similar connective member, the play in the brake rigging being taken up by screwing the turnbuckle along the brake rod. To install the valve member embodying the present invention the turnbuckle is removed and the fitting of this invention mounted in its place upon the brake rod, this fitting serving as a coupling for the brake rigging and providing means for taking up the play therein, as well as a control valve for operating a servo-brake.

I claim:

1. In a combined fluid-control valve and coupling member for a brake pedal and a brake rod of a motor vehicle, a casing provided with valve ports and apertured to receive the brake rod, said casing also being provided with a recess, clamping nuts on the brake rod disposed in said recess, a movable valve member carried by the casing and adapted to cooperate with said ports and an actuating member secured in position by said clamping nuts and engaging said movable valve member to control the passage of fluid through said ports.

2. In a combined fluid-control valve and coupling member for a brake pedal and a brake rod of a motor vehicle, a casing provided with valve ports and means whereby an adjustable lost-motion connection is effected between the brake pedal and brake rod, a pivoted valve member disposed on the outside of said casing and arranged to cooperate with the valve ports therein and means for actuating said pivoted valve member upon relative movement between the brake rod and brake pedal.

3. In a combined fluid-control valve and coupling member for a brake pedal and a brake rod of a motor vehicle, a casing provided with valve ports and means whereby an adjustable lost-motion connection is effected between the brake pedal and brake rod, a pivoted valve member disposed on the outside of said casing and arranged to cooperate with the valve ports therein and an operating pin engaging said pivoted valve member to actuate the same upon relative movement between the brake rod and brake pedal.

4. In combination with the brake rodding of a motor vehicle, said brake rodding including a brake rod or connection through which the brakes of said vehicle are applied, a combined fluid-control valve and coupling member for said brake rodding comprising a casing provided with a valve port and an aperture to receive an end portion of the brake rod, the brake rod being movable to a limited extent with respect to the casing, a movable valve member carried by said casing and adapted to cooperate with said valve port and means including a threaded clamping member on a threaded portion of said brake rod at the inner end of said aperture for actuating said movable valve member upon relative movement between said rod and casing.

WILLIAM J. BESLER.